US007963302B2

(12) United States Patent
Thomas et al.

(10) Patent No.: US 7,963,302 B2
(45) Date of Patent: Jun. 21, 2011

(54) MACHINE FOR TESTING CONTAINER CAPACITY

(75) Inventors: Alan E. Thomas, Clearwater, FL (US); Michael C. Bagley, Palm Harbor, FL (US); Philippe Spiteri, St. Petersburg, FL (US)

(73) Assignee: Emhart Glass S.A., Cham (CH)

( * ) Notice: Subject to any disclaimer, the term of this patent is extended or adjusted under 35 U.S.C. 154(b) by 936 days.

(21) Appl. No.: 11/903,868

(22) Filed: Sep. 24, 2007

(65) Prior Publication Data

US 2008/0110522 A1 May 15, 2008

Related U.S. Application Data

(60) Provisional application No. 60/827,009, filed on Sep. 26, 2006, now abandoned.

(51) Int. Cl.
*B65B 1/30* (2006.01)
*G01M 3/02* (2006.01)

(52) U.S. Cl. .............. 141/95; 141/83; 141/94; 141/198; 141/148; 141/153; 73/37; 73/45

(58) Field of Classification Search .................... 141/83, 141/94, 95, 144–148, 153, 165, 192, 198; 73/37, 40, 45, 49.2
See application file for complete search history.

(56) References Cited

U.S. PATENT DOCUMENTS

| | | | | |
|---|---|---|---|---|
| 3,751,973 | A * | 8/1973 | Strauss et al. | 73/45 |
| 3,771,649 | A * | 11/1973 | Strauss | 209/3.1 |
| 3,879,987 | A * | 4/1975 | Yasuhiro et al. | 73/37 |
| 4,033,172 | A * | 7/1977 | Flamand | 73/37 |
| RE31,385 | E * | 9/1983 | Schmidt et al. | 73/37 |
| 4,557,301 | A * | 12/1985 | Jorss | 141/5 |
| 4,582,102 | A * | 4/1986 | Risser | 141/95 |
| 4,788,850 | A * | 12/1988 | Buschor et al. | 73/49.2 |
| 5,295,517 | A * | 3/1994 | Ahlers | 141/1 |
| 5,319,957 | A * | 6/1994 | Stieger et al. | 73/49.2 |
| 6,474,368 | B2 * | 11/2002 | Clusserath et al. | 141/6 |
| 7,543,479 | B2 * | 6/2009 | Thomas et al. | 73/37 |

* cited by examiner

*Primary Examiner* — Timothy L Maust
(74) *Attorney, Agent, or Firm* — Reinhart Boerner Van Deuren s.c.

(57) ABSTRACT

An inspection machine for inspecting the volume of liquid contained by a bottle filed to its defined fill height. A head is lowered and has a sealing plate which seals the open finish of a bottle. A fill tube assembly is part of the head and continues to be lowered until a level sensor is located to sense liquid at a pre-fill level. High and low pressure water lines which are a part of the fill tube assembly are operated to fill the bottle to the pre-fill level. The sealing plate is released and then the process is repeated lowering the sensor to the post-fill level and operating only the low-pressure line to fill the bottle to the post-fill level. The total liquid filling the bottle is then computed.

2 Claims, 5 Drawing Sheets

MACHINE FOR TESTING CONTAINER CAPACITY

The present invention is a continuation-in-part of U.S. patent application Ser. No. 60/827,009, filed Sep. 26, 2006, now abandoned.

The present invention relates to machines for inspecting containers to provide feedback information to be used by an operator to modify the performance of the machine that produced the container.

BACKGROUND OF THE INVENTION

It is important that a bottle be filled with the correct volume of liquid. Too little liquid raises customer issues since a customer expects to receive the quoted volume and too much liquid raises cost issues since a container with excess liquid has an unnecessarily high cost.

Prior art systems that test the capacity volume of a container often require operators to take a container, weigh the container, fill the container, measure the water temperature, draw off water to the defined fill level and re-weigh the container. A temperature correction must then be made to define the volume of liquid.

OBJECT OF THE INVENTION

It is accordingly an object of the present invention to provide a machine that can automatically define the volume of liquid contained by a container.

Other objects and advantages of the present invention will become apparent from the following portion of this specification and from the accompanying drawings which illustrate, in accordance with the mandate of the patent statutes, a presently preferred embodiment incorporating the principles of the invention.

BRIEF DESCRIPTION OF THE PREFERRED EMBODIMENT

Figure 1:
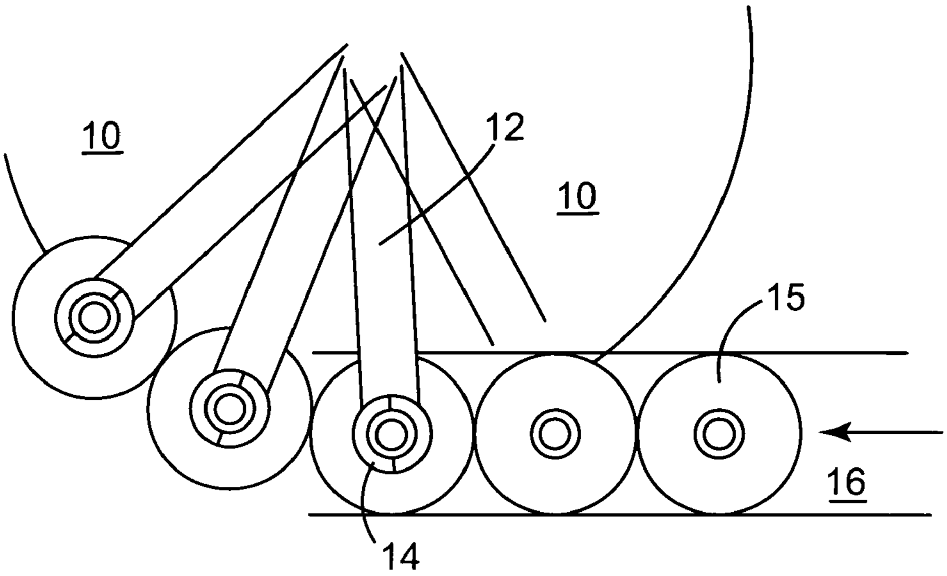
FIG. 1 is a top schematic view of an inspection machine having a turret assembly which receives bottles from a feed conveyor.
Figure 2:
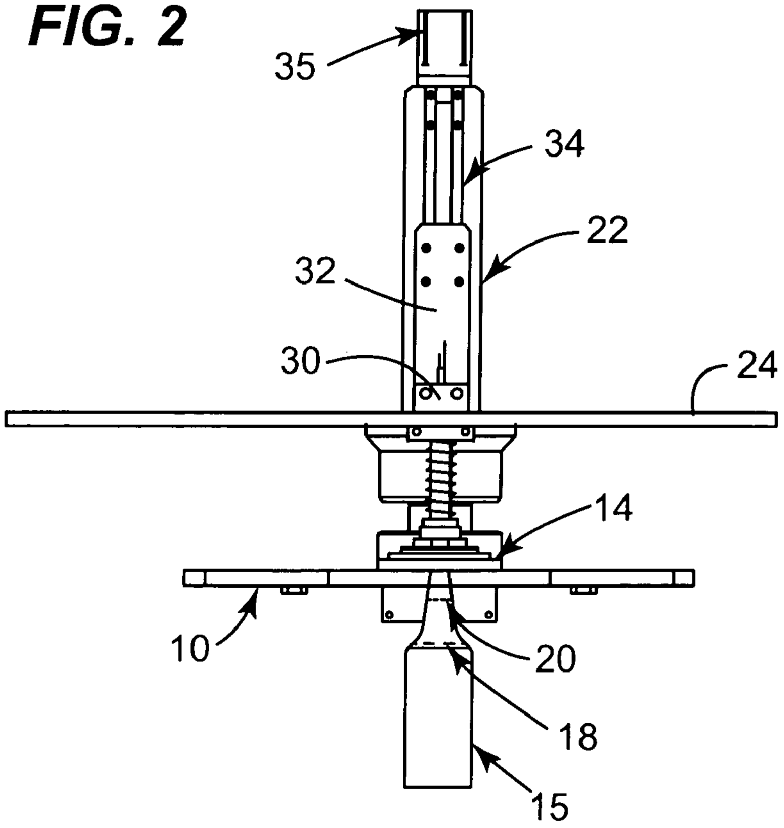
FIG. 2 is an elevational view showing a bottle at the inspection station.

The inspection machine has a turret assembly 10 which includes a number of angularly spaced arms 12 each having a bottle gripper 14 at the outer end which is displaceable between an open position and a closed position where the bottle 15 is gripped or supported immediately below the finish of the bottle. The turret assembly receives bottles from a suitable conveyor 16. FIG. 2 illustrates a bottle at the inspection station. Indicated on the bottle are a pre-fill height line 18 and a post-fill height line 20 (which corresponds to the desired fill level of the bottle).

Figure 3:
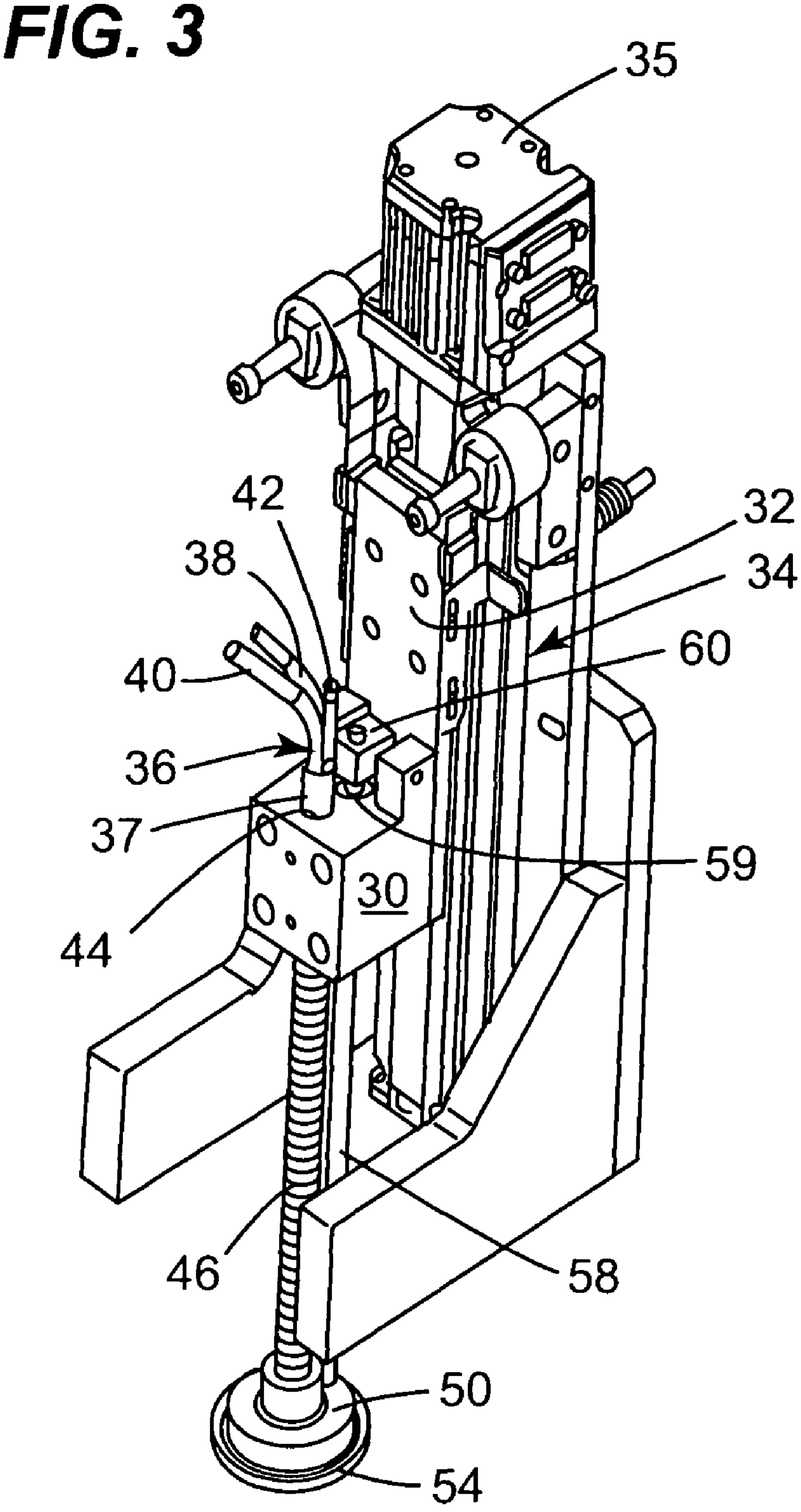
FIG. 3 is an oblique view of the capacity sensor assembly.
Figure 4:
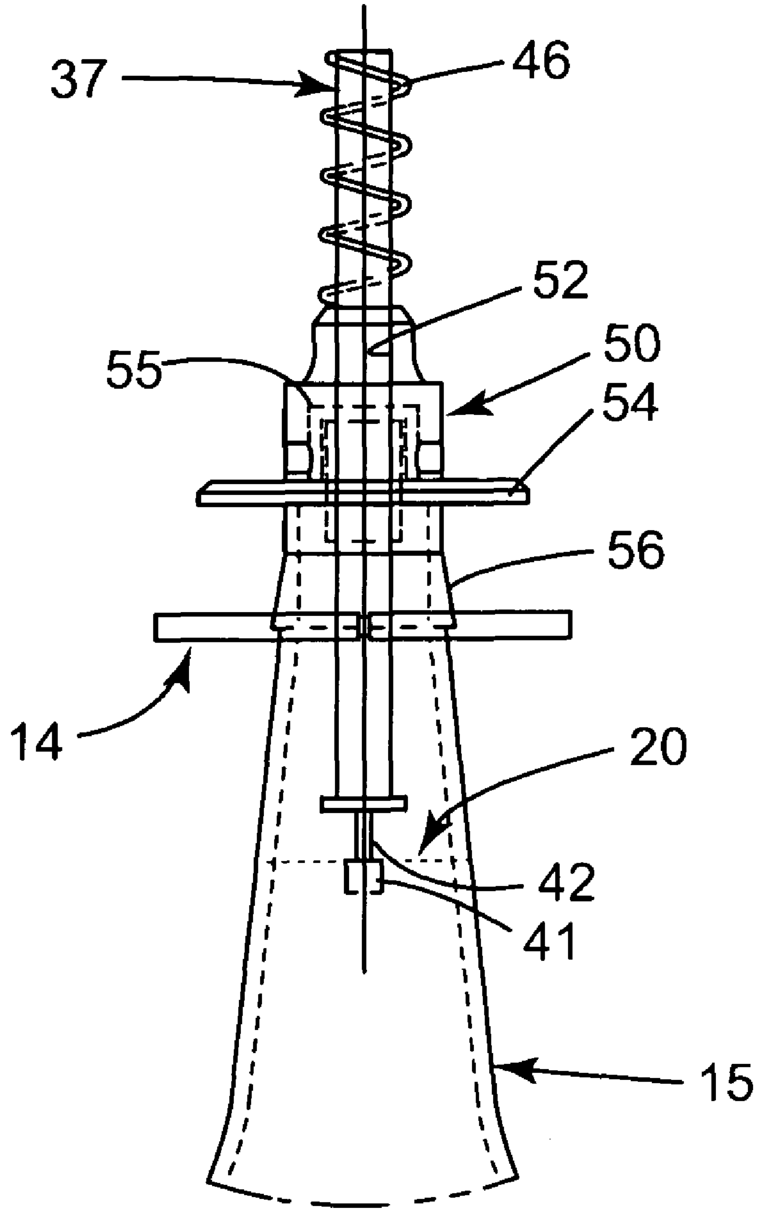
FIG. 4 is an elevational view of a portion of the capacity sensor assembly.

A capacity sensor assembly 22, supported by a plate 24, overlies the bottle at the inspection station. A support block 30 (FIGS. 2-4) is secured to a vertically displaceable slide 32 of a linear actuator 34 which is driven by a servomotor 35. A fill tube assembly 36, made up of a cylindrical tube 37, a high pressure water conduit 38, a low pressure water conduit 40 and a liquid level sensor, which can be a prismatic element 41 secured to the bottom of a sensor cable 42, secured within the tube 37, is mounted in a suitable through hole 44 in the support block 30. A spring 46 is secured at its top to the bottom of the support block around the cylindrical tube 37 and is secured at its bottom to a fill height block 50. The fill height block 50, which has a vertical hole 52 (FIG. 4) through which the fill tube passes, has secured at its bottom, an annular sealing plate 54 which, as the support block is lowered, will engage and seal the top surface 55 of the bottle finish 56. A vertical pin 58 (FIG. 3) is screwed into a suitably threaded hole in the top of the fill height block and extends through a vertical hole 59 in the support block. Affixed to its top is a light break 60. When the sealing plate engages the finish, further displacement of the support block elevates the light break 60 breaking a light beam thereby generating a Sealing Plate On/Off Finish signal (FIG. 5).

Figure 5:
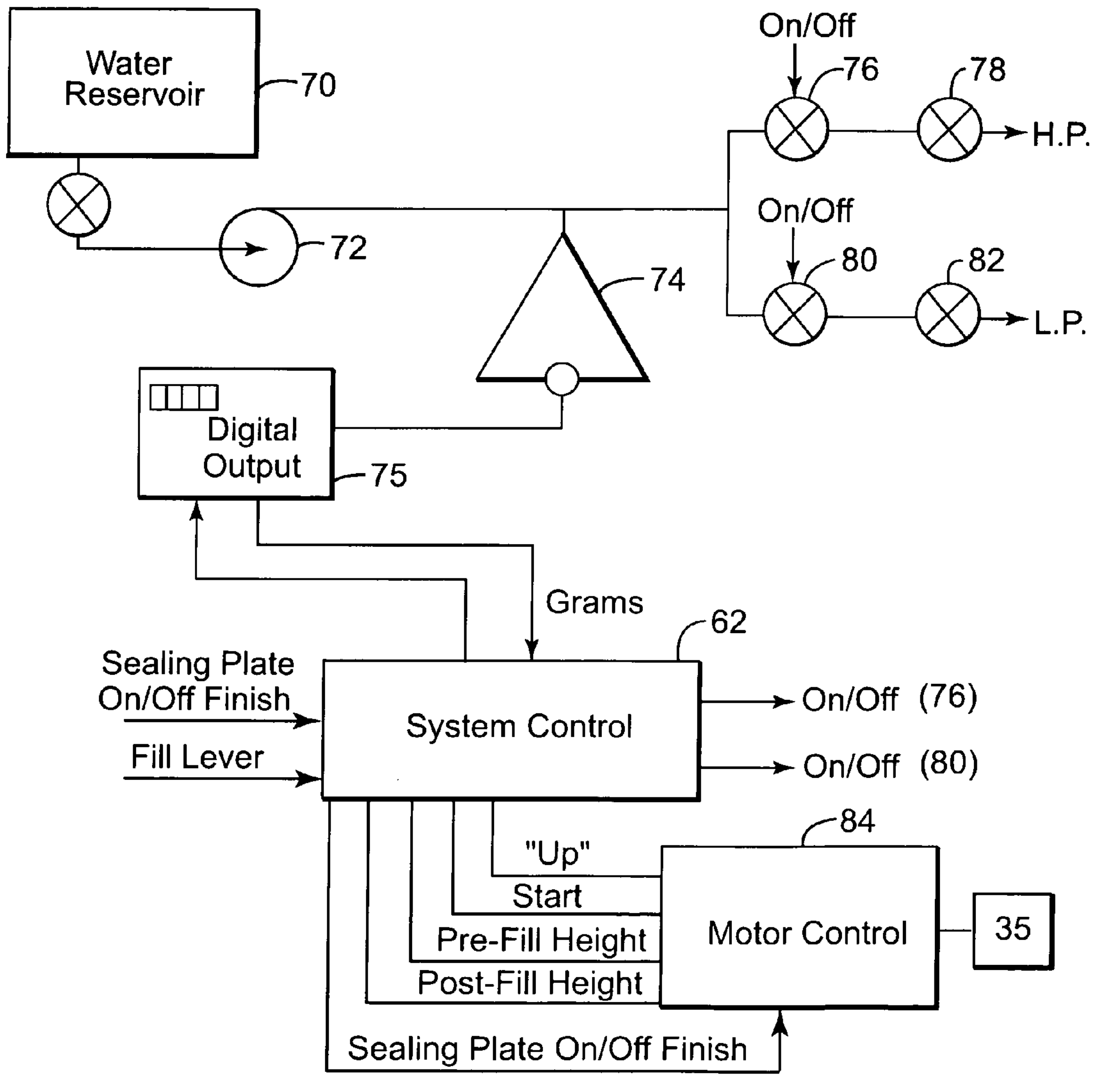
FIG. 5 is a system schematic.
Figure 6:
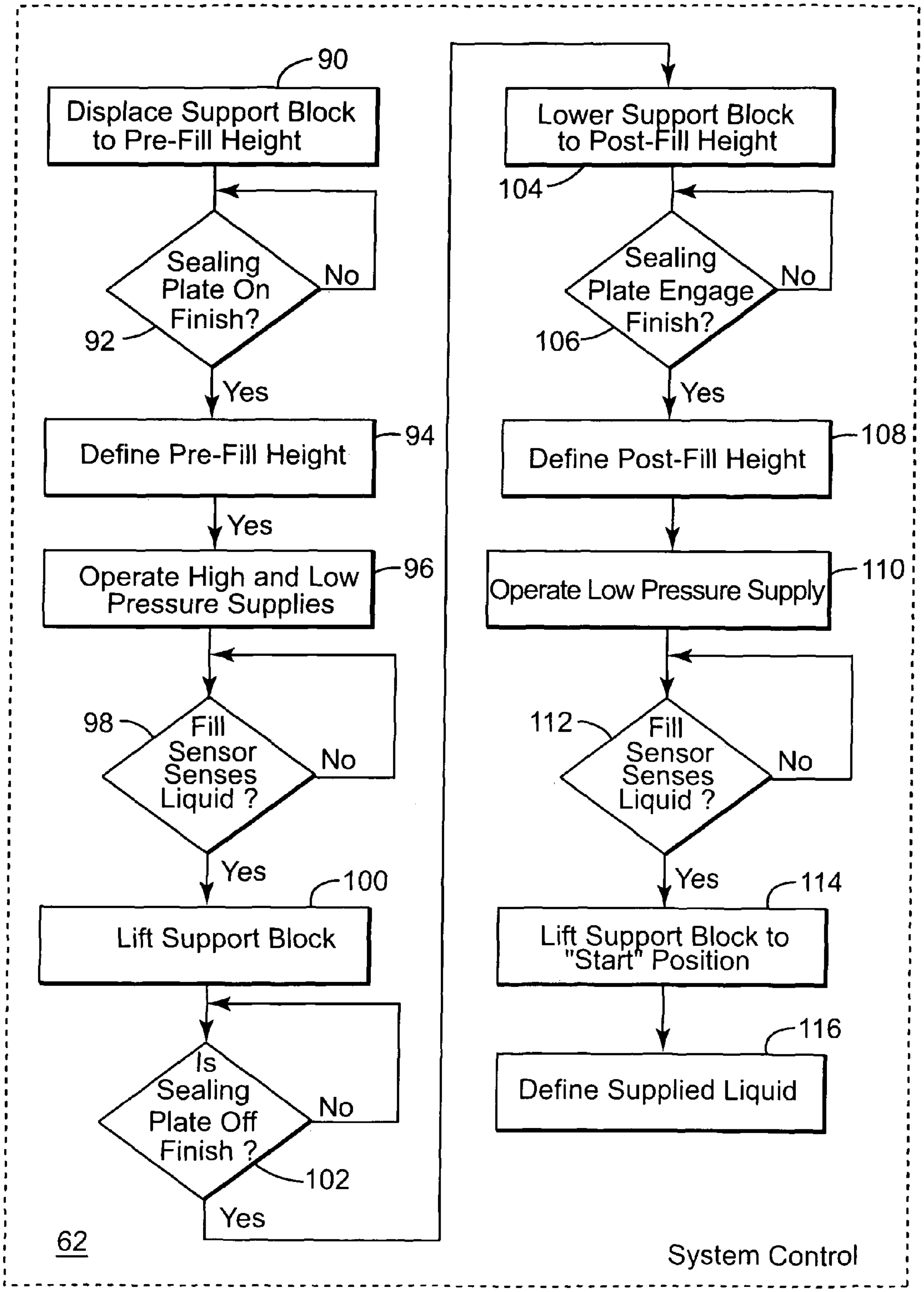
FIG. 6 is a logic diagram illustrating the System Control.

The overall system is shown in FIG. 5. Water from a Water Reservoir 70 is supplied to a high-pressure pump 72 which supplies a Coriolis valve 74. The output of this valve is split. One line goes to a first ON/OFF valve 76 and then to a first pressure reducer valve 78 which outputs water at high pressure (H.P.) to the high-pressure conduit 36. The other line goes to a second ON/OFF valve 80 and then to a second pressure reducer valve 82 which outputs water at low pressure (L.P.) to the low-pressure conduit 40. The Coriolis valve has a Digital Output 75 which supplies Grams of flow upon the request of the System Control 62. A single valve is shown but it can be equally be a pair of valves each connected to a pressure line and having a digital readout supplied to the System Control 62.

The System Control 62 also receives a Fill Level signal from the level sensor when liquid is sensed at the pre or post fill levels and operates the first and second On/Off valves 76/80 with suitable On/Off signals. The System Control 62 also instructs the Motor Control 84 to locate the support block at the "START", "Pre-Fill Height" or "Post-Fill Height" positions and instructs the support block to go "UP". The System Control also supplies a Sealing Plate On Finish signal, which is triggered by the light block, to the Motor Control 84.

When a bottle to be inspected is located at the inspection station with the support block at the Start position, the System Control 62 instructs the Motor Control 84 to Lower Support Block to Pre-Fill Height 90. When the System Control 62 answers the query "Sealing Plate On Finish?" 92 in the affirmative, the Motor Control will Define Pre-Fill Height 94 as a distance vertically down from the top of the finish. The System Control 62 will then instruct the Motor Control 84 to Operate High and Low Pressure Supplies 96 by sending "ON" signals to the high and low pressure on/off valves 76/80. When the liquid level has been raised to the pre-fill height, the query "Fill Sensor Senses Liquid 98?" will be answered in the affirmative and the System Control 62 will issue an "UP" signal to the Motor Control 84 to Lift Support Block 100. When the sealing plate is lifted off the top of the finish, the Sealing Plate On Finish signal will be removed (the light break 60 again blocks the light path), whereby the query "Is Sealing Plate Off Finish?" 102 can be answered in the affirmative. This allows the bottle to freely reposition itself in the bottle gripper 14 as a result of the added weight of the water.

The System Control 62 issues a "Post-Fill Height" signal to the Motor Control 84 to Lower Support Block to Post-Fill Height 104. When the System Control receives the Sealing Plate On Finish Signal, the query Sealing Plate Engages Finish 106 can be answered in the affirmative and the System Control 62 will Define Post-Fill Height 108. The System Control will Operate Low Pressure Supply 110 by sending an "ON" signal to the low pressure on/off valve 80. When the liquid level has been raised to the post-fill height, the query "Fill Sensor Senses Liquid 112?" will be answered in the affirmative and the System Control will issue a "Start" signal to the Motor Control to Lift Support Block To Start Position 114. The System Control will now update the digital grams since the last bottle to Define Supplied Liquid 116. This enables the operator to know whether, the post-fill line is at the correct location.

The invention claimed is:

1. A machine for measuring the volume of liquid contained within a bottle below a defined fill line, the bottle having a formed finish at the top thereof, comprising a feeder including a plurality of spaced grippers for sequentially gripping a bottle and delivering the gripped bottle to an inspection location, said grippers gripping a bottle at a location below and proximate to the finish of the bottle, a fluid capacity inspection station including an actuator having a vertically displaceable slide, a motor control for operating said actuator to displace said slide downwardly from a start position to a pre-fill height position, upwardly from said pre-fill height position to a sealing plate off position, downwardly from said sealing plate off position to a post-fill height position, and upwardly from said post-fill height position to said start position, a head secured to said slide, said head including a fill tube assembly including a fill tube, first and second water conduits for delivering water into the fill tube and a sensor cable extending downwardly through said fill tube and having a level sensor at the bottom thereof, a flow meter for measuring the flow of liquid there through and for delivering the measured liquid conjointly to a high volume/time delivery means for delivering the liquid from the flow meter to said first water conduit, and low volume/time delivery means for delivering the liquid from the flow meter to said second water conduit, a sealing plate assembly including a sealing plate for engaging the top surface of the finish, said sealing plate assembly having a vertical hole there through for receiving said fill tube, spring means interconnecting said head and said sealing plate assembly for supporting said sealing plate assembly at a selected vertical location when said head is at said start position while permitting said fill tube to move downwardly relative to said sealing plate assembly when said sealing plate engages the finish of a bottle, a system control for operating the machine in a first mode wherein the head is displaced to the pre-fill height position, said high volume/time and low volume/time delivery means is operated until the level sensor senses liquid at the pre-fill height whereupon said high volume/time and low volume/time delivery means is turned off and said head is displaced to the off finish position, and for operating the machine in a second mode following the location of said head at the off finish position wherein the head is displaced down to the post-fill position, and said low volume/time delivery means is operated until the liquid sensor senses liquid at the post-fill position, and said control including means for computing the liquid delivered by said high volume/time and low volume/time delivery means.

2. A machine according to claim 1, wherein said flow meter is a Coriolis mass flow meter.

* * * * *